(12) United States Patent
Augustyn

(10) Patent No.: US 7,594,686 B2
(45) Date of Patent: Sep. 29, 2009

(54) AUTOMOTIVE DOOR TRIM MAP POCKET UMBRELLA HOLDER

(75) Inventor: Nicholas H. Augustyn, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 9 days.

(21) Appl. No.: 11/842,217

(22) Filed: Aug. 21, 2007

(65) Prior Publication Data

US 2009/0051186 A1 Feb. 26, 2009

(51) Int. Cl.
*B60R 7/04* (2006.01)

(52) U.S. Cl. .................. 296/37.13; 296/146.7

(58) Field of Classification Search ............. 296/37.8, 296/37.13, 38, 1.08, 1.09, 146.7; 224/543, 224/915

See application file for complete search history.

(56) References Cited

U.S. PATENT DOCUMENTS

| | | | | |
|---|---|---|---|---|
| 3,081,126 | A | * 3/1963 | Theberge | 296/37.1 |
| 3,124,287 | A | * 3/1964 | Belzer | 224/311 |
| 4,378,888 | A | * 4/1983 | Reed | 211/63 |
| 4,453,760 | A | * 6/1984 | Hira | 296/37.13 |
| 4,619,477 | A | * 10/1986 | Kneib et al. | 296/37.13 |
| 4,795,067 | A | 1/1989 | Hamilton | |
| 4,807,920 | A | 2/1989 | Fujiki et al. | |
| 5,702,144 | A | * 12/1997 | Matsuura et al. | 296/37.13 |
| 5,758,811 | A | * 6/1998 | Aumiller et al. | 224/563 |
| 5,800,004 | A | * 9/1998 | Ackeret | 296/37.13 |
| 6,116,672 | A | 9/2000 | Cannon et al. | |
| 6,120,077 | A | * 9/2000 | Westphal et al. | 296/37.13 |
| 6,196,606 | B1 | 3/2001 | McGoldrick | |
| 6,863,329 | B2 | 3/2005 | Fero | |
| 6,880,874 | B1 | 4/2005 | Kallenberger et al. | |
| 6,926,332 | B2 * | 8/2005 | Youngs et al. | 296/37.13 |
| 6,971,698 | B1 | 12/2005 | King | |
| 7,063,367 | B2 | 6/2006 | Wakou et al. | |
| 7,192,074 | B2 * | 3/2007 | DePue et al. | 296/37.9 |
| 7,237,933 | B2 * | 7/2007 | Radu et al. | 362/488 |
| 7,328,825 | B2 * | 2/2008 | Kaiser | 224/543 |

FOREIGN PATENT DOCUMENTS

| | | |
|---|---|---|
| JP | 56050812 | 5/1981 |
| JP | 08072622 | 3/1996 |
| JP | 08099585 | 4/1996 |
| JP | 10016651 | 1/1998 |
| JP | 2001105983 | 4/2001 |
| JP | 2003063249 | 3/2003 |
| JP | 2005041451 | 2/2005 |
| JP | 2006256537 | 9/2006 |

* cited by examiner

*Primary Examiner*—Glenn Dayoan
*Assistant Examiner*—Gregory Blankenship
(74) *Attorney, Agent, or Firm*—Gifford, Krass, Sprinkle, Anderson & Citkowski, P.C.

(57) ABSTRACT

An automotive door comprising a door trim member (10) with a map-receiving pocket (12) that is defined by a back member (16) that is secured to the door trim member and an inner member (14) that is secured to the back member with an umbrella-receiving member (18) that is accessible through the map-receiving pocket and is defined by a U-shaped member (24) that is attached to the door trim member and is adapted to receive an umbrella (20).

10 Claims, 3 Drawing Sheets

AUTOMOTIVE DOOR TRIM MAP POCKET UMBRELLA HOLDER

FIELD OF THE INVENTION

This invention relates to an automotive door trim map pocket that has a hidden umbrella holder.

BACKGROUND OF THE INVENTION

U.S. Pat. No. 4,807,920 (Fujiki et al.) discloses a passenger automotive vehicle with an umbrella holder that is positioned within inner and outer panels of a rear fender of the vehicle in a chamber that requires a biasing spring or other biasing means to bias the umbrella outwardly from the compartment in which it is stored. The door of the vehicle must be opened before the umbrella can be released, and the requirement for a separate compartment and a spring to outwardly bias the umbrella from the compartment adds to the complexity of the invention and its cost.

U.S. Pat. No. 6,880,874 B1 (Kallenberger et al.) discloses a storage receptacle for use in storing small items, such as eyeglasses, in a map pocket of an automotive door lining. This reference does not disclose or teach that the patented construction can be used to store larger items, such as umbrellas.

BRIEF DESCRIPTION OF THE INVENTION

According to the present invention, appropriate hidden storage for an umbrella is provided in a map pocket that is positioned on an inside of the trim member of an automotive vehicle, the umbrella holder being integrated with the map pocket. The umbrella is readily accessible to an occupant seated next to the door, the driver in the case of a combined map pocket and umbrella holder positioned at the driver's side door, and suitable umbrella storage is provided without any additional elements or assembly operations.

For a further understanding of the present invention, attention is directed to the drawing and the following brief description thereof, to the detailed description of the invention and to the appended claims.

DETAILED DESCRIPTION OF THE INVENTION

Figure 1:
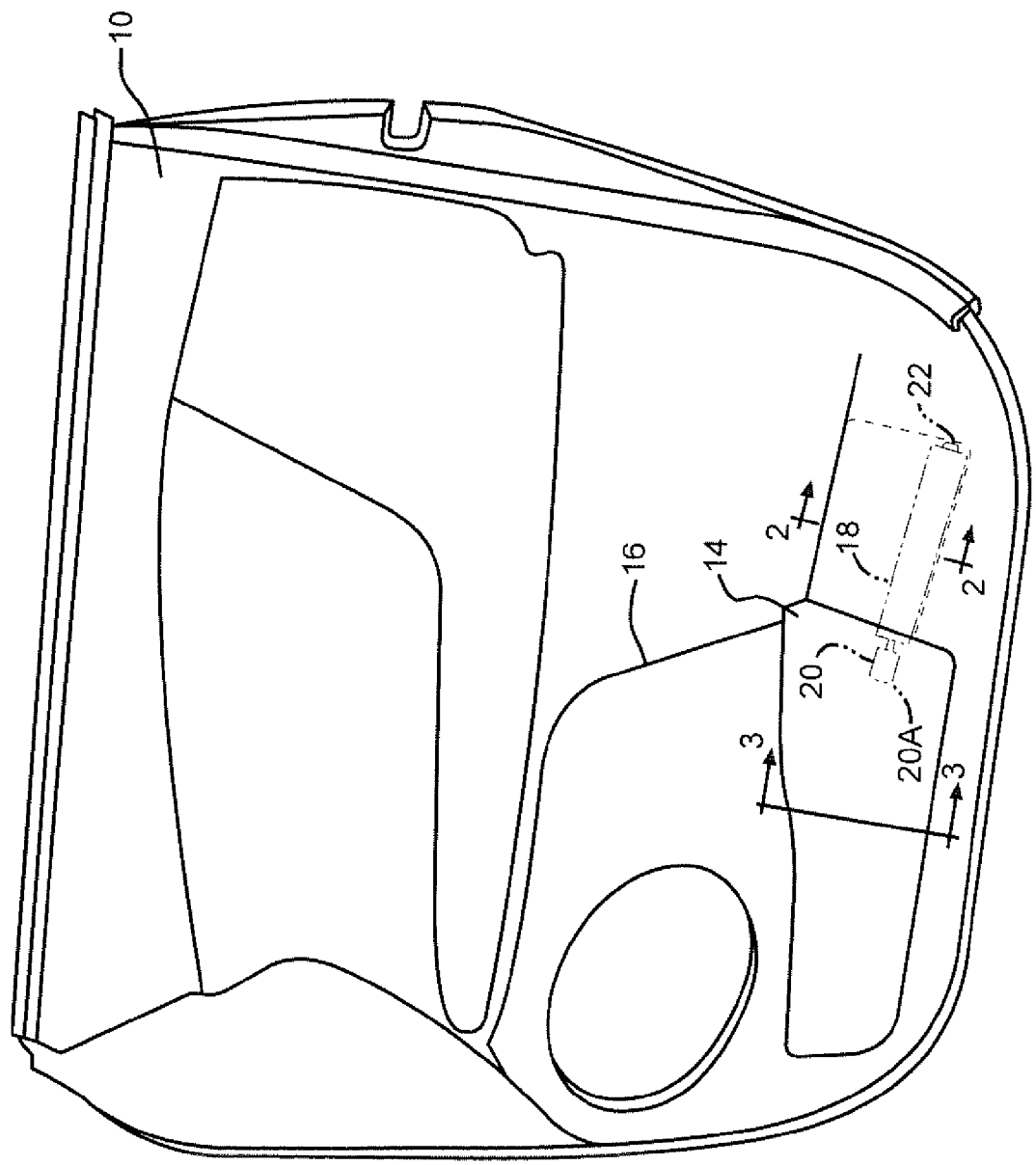
FIG. 1 is an elevation view of automotive vehicle door trim member with a combined map pocket and umbrella holder according to the present invention.
Figure 2:
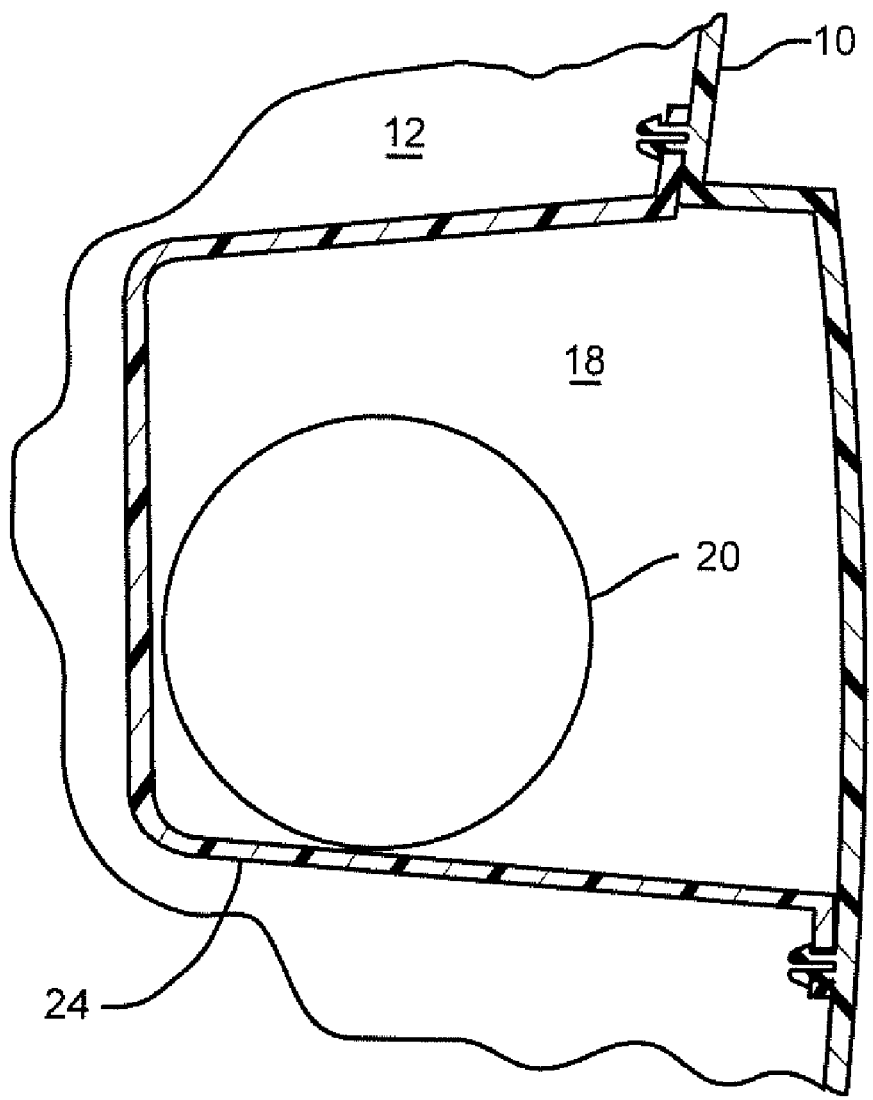
FIG. 2 is a sectional view taken on section line 2-2 of FIG. 1.
Figure 3:
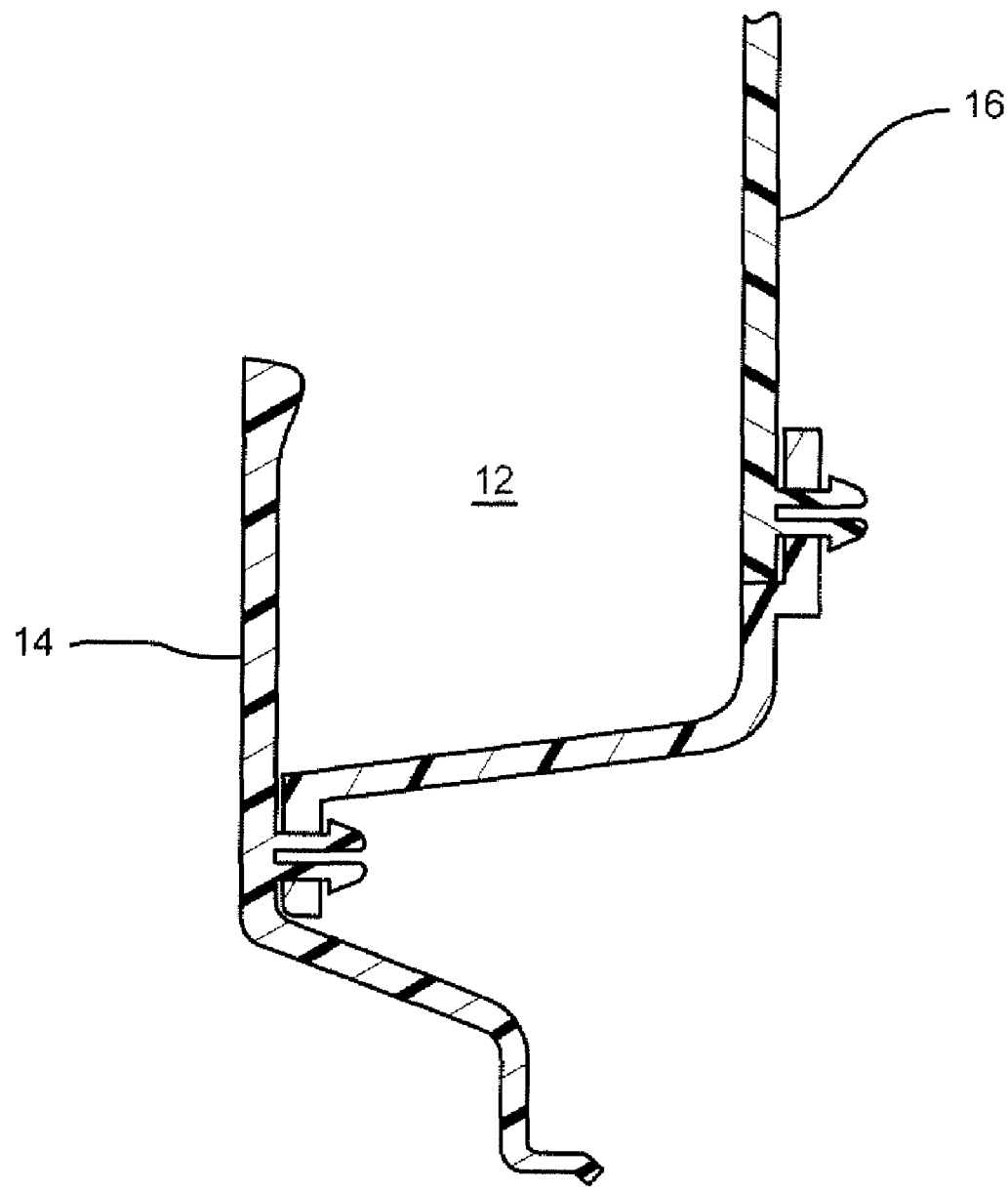
FIG. 3 is a sectional view taken on line 3-3 of FIG. 1.

An inside surface of an automotive door trim member is indicated by reference numeral 10. A map-receiving pocket member 12 is defined in the door trim member 10 by an inner member 14 and a back member 16. The door trim member may be made as separate elements or it may be made as a single, integrated element. An umbrella-receiving member 18 that opens into the pocket member 12 extends rearwardly from the pocket member 12 and is inclined in a downward direction as it proceeds from the pocket member 12 to utilize gravity to retain an umbrella 20 within the umbrella-receiving member 18. The umbrella-receiving member 18 is formed by a U-shaped member 24 that is secured to an inwardly facing surface of the door trim member 10 and is closed at an end 22 that is away from the map-receiving pocket member 12. The back member 16 and the U-shaped member may be made as separate elements or they may be made as a single, integrated element.

The longitudinal extent of the umbrella-receiving member 18 is such that an end 20A of the umbrella 20 can be reached by hand from the map pocket member 12 and without the need to open a door to which the door trim member 10 is attached, while at the same time the umbrella-receiving member 18 is hidden from the sight of an adjacent occupant of the vehicle. Nevertheless, the umbrella 20 is readily available to the adjacent occupant if and when it is needed to protect the occupant from a rainfall while exiting the associated vehicle. Attachment of the inner member 14 to the back member 16 may be by heat staking, if using heat-stakeable components, by threaded fasteners or by snap attachments, as may be the attachment of the umbrella-receiving member 24 to the door trim member 10.

The best mode known to the inventor for carrying out the present invention as of the filing date hereof has been shown and described herein, but it will be apparent to those skilled in the art that suitable modifications, variations and equivalents may be made without departing from the scope of the invention, such scope being limited solely by the terms of the following claims and the legal equivalents thereof.

The invention claimed is:

1. An automotive door comprising:
    a door trim member having an inside surface, an outer surface opposite the inside surface, and an aperture;
    a map-receiving pocket disposed on the inside surface of the door trim member, the map-receiving pocket having a open top, and wherein a portion of the map-receiving pocket is in communication with the aperture;
    an umbrella-receiving pocket disposed on the outer surface of the door trim member so as to be hidden from the view of the vehicle occupant by the door trim member, the umbrella-receiving pocket having an opening opposite a closed end, and wherein the opening is in communication with the aperture so as to allow an umbrella to be passed through the open top of the map-receiving pocket and the aperture into the umbrella-receiving pocket.

2. The automotive door according to claim 1 wherein:
    the umbrella-receiving pocket extends downwardly as it proceeds away from the map-receiving pocket so as to allow gravity to assist in retaining an umbrella in the umbrella-receiving pocket.

3. The automotive door according to claim 1 wherein the umbrella-receiving pocket and the door trim member are made as separate elements.

4. The automotive door according to claim 1 wherein the umbrella-receiving pocket and the door trim member are made as a single, integrated element.

5. The automotive door according to claim 1 further including a u-shaped member enclosing a portion of the outer surface so as to define the umbrella-receiving pocket, the u-shaped member has a first end opposite a second end, wherein the first end is in communication with the open side and the second end is enclosed by an abutment.

6. The automotive door according to claim 1 wherein the door trim member and the umbrella-receiving pocket are manufactured from heat-stakeable materials and wherein the umbrella-receiving pocket is secured to the outer surface by heat staking.

7. The automotive door according to claim 1 wherein the door trim member is secured to the vertical wall by threaded fasteners.

8. The automotive door according to claim 5 wherein the generally U-shaped member and the back trim member are manufactured from heat-active materials, and the U-shaped member is secured to the outer surface by heat staking.

9. The automotive door according to claim 5 wherein the umbrella-receiving pocket is secured to the outer surface by threaded fasteners.

10. The automotive door according to claim 5 wherein the generally U-shaped member is secured to the outer surface by snap attachments.

* * * * *